June 4, 1957    I. C. PERCIVAL ET AL    2,794,278
BREAST TAG
Filed June 6, 1955
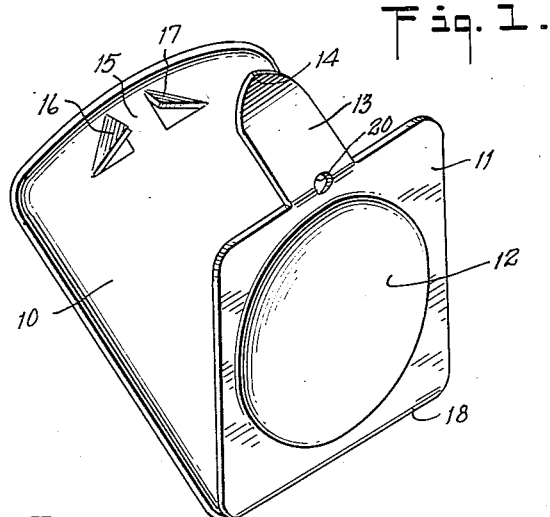
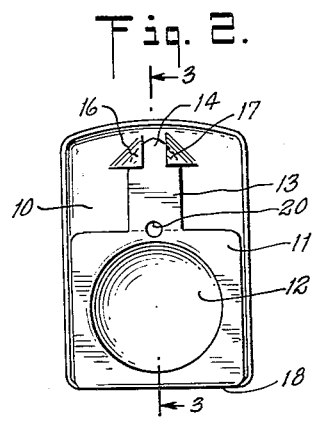
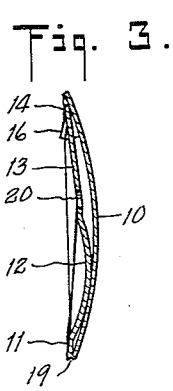
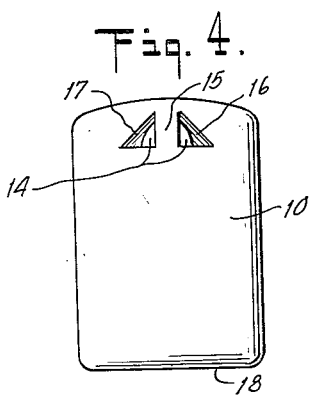
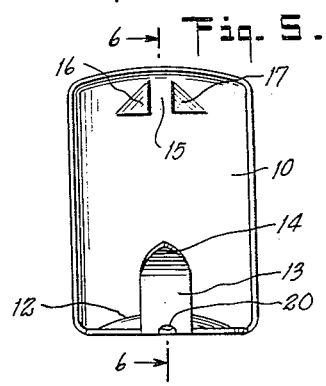
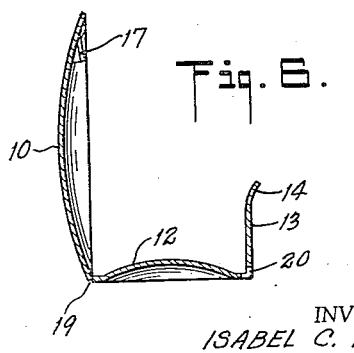
INVENTORS
ISABEL C. PERCIVAL
JOSEPH E. TIERNEY
BY
Robert Henderson
ATTORNEY

United States Patent Office 2,794,278
Patented June 4, 1957

1

2,794,278

BREAST TAG

Isabel C. Percival and Joseph E. Tierney, Ottawa, Ontario, Canada, assignors, by mesne assignments, to E. J. Brooks Company, Newark, N. J., a corporation of New Jersey Application June 6, 1955, Serial No. 513,373

Claims priority, application Canada October 29, 1954

6 Claims. (Cl. 40—3)

This invention relates to tags used extensively applied to the breasts of dressed poultry, although they may also be used to attach to fabrics and the like.

Previously known breast tags have been liable to puncture the skin and also to puncture the plastic bags which are shrunk on the birds before cold storage.

We have found that these disadvantages may be overcome by providing the lip, under which the tip of the tongue seals, in two parts leaving a bar of the main portion of the tag between the parts. The space between the two parts allows skin to protrude between them, ensuring that it is not punctured. The bar between the parts also prevents the tip of the tongue from protruding through to the face of the tag, avoiding any possibility of puncturing the bag.

In the drawings which illustrate embodiments of the invention the tag is shown unattached to a bird for the sake of clearness.

Figure 1 is an enlarged perspective view of the tag.

Figure 2 is a plan view of the back of the tag when closed.

Figure 3 is a section on line 3—3 of Figure 2.

Figure 4 shows the front of the tag when closed.

Figure 5 is a plan view of the tag open and ready for applying to the breast of a bird.

Figure 6 is a section on line 6—6 of Figure 5.

The tag is preferably stamped out from sheet material. It consists of a main body portion 10 which may be dished, at one end of portion 10 a leaf 11 is integrally attached. This leaf has a depression 12 occupying the majority of the area thereof. The remote edge of the leaf from the portion 10 has a tongue 13 extending therefrom and terminating in an upturned blunt point 14.

Adjacent the free end of portion 10 two right angular slits are made leaving a solid bar 15 between them and lips 16 and 17 formed by the slits are upstruck on the underside of portion 10.

The tag as shipped to the user is shown in Figures 1, 5 and 6, with the leaf 11 extending substantially at right angles from the underside of dished portion 10 and the tongue at a right or obtuse angle to the leaf making it more or less parallel to portion 10. The joining edge 18 of the portion 10 and leaf 11 has a weakening groove 19 along its length to ensure breaking if the tag is opened after use. The tongue has a weakening hole 20 where it joins the leaf 11, or alternatively a weakening groove similar to 19, to ensure bending along the line of junction. The tongue 13 is also upturned at its end 14, to make it slide forward under the lips 16 and 17 when closing pressure is exerted on the tag.

When in use the space between the lips 16 and 17 enables the skin to protrude over the bar 15, so that point 14 is unable to puncture it. The bar 15 also prevents the point 14 from protruding to the face of the tag, ensuring that when the plastic bag is shrunk on the bird the point 14 cannot puncture the bag.

To apply, the tag is grasped between thumb and finger, the finger being accommodated in the depression 12, the tip being engaged with the skin of the bird and pressed under the lips 16 and 17, the skin bulging over bar 15 when the tag is locked.

Indicia may be applied to the tag by embossing, stamping, printing or other means.

Changes within the scope of the invention shown will be apparent to those skilled in the art, it is therefore intended that the disclosure shall not be read in a restricted light except as provided by the following claims.

The embodiments of the invention in which an exclusive property or privilege is claimed are defined as follows:

1. A breast tag comprising a body portion, an integral leaf at one end of the body portion, a pointed tongue on said leaf at the end thereof remote from the body portion, upstruck lips adjacent the other end of the body portion and a bar of said body portion between the lips to prevent the point of the tongue from projecting through said body portion.

2. A breast tag comprising a body portion, an integral leaf at one end thereof, a tongue on said leaf at the end remote from the body portion and two upstruck spaced lips adjacent the free end of the body portion, to receive the tongue when the tag is closed and a solid bar of the base portion between said lips to prevent the point of the tongue from projecting through the body portion.

3. A breast tag according to claim 2, wherein the leaf has means to prevent a finger of the operator from slipping forward.

4. A breast tag comprising a dished body portion, an integral leaf at one end of the body portion, the junction of the leaf and body portion being weakened, said leaf having means to prevent a finger of the operator from slipping forward, a pointed tongue projecting from the free end of the leaf, the point of said tongue being upturned, two spaced lips upstruck from the body portion adjacent the free end thereof to receive the point of the tongue when the tag is closed and means to prevent the point of the tongue from projecting through the body.

5. A breast tag according to claim 4, wherein the said means to prevent the point from projecting through the body is a part of the body portion between the lips.

6. A breast tag of sheet material comprising, in longitudinal alignment, a body portion, a leaf portion bendably and integrally connected at one of its ends to one end of the body portion, and a tongue bendably and integrally connected to the other end of said leaf portion; said body portion having a pair of laterally spaced lips struck up therefrom and a longitudinal, uninterrupted bar between said lips, and said tongue having opposite side portions, adapted to slide underneath said lips, and an extremity coincident with a longitudinal line extending between said side portions and adapted, when the latter are underneath said lips, to lie in intimate relationship with said bar but being blocked by the latter against extending through the sheet material of the body portion.

References Cited in the file of this patent

UNITED STATES PATENTS

| 2,611,200 | Ashton | Sept. 23, 1952 |
| 2,686,379 | Moberg | Aug. 17, 1954 |